United States Patent [19]
Glover et al.

[11] Patent Number: 5,893,355
[45] Date of Patent: Apr. 13, 1999

[54] SUPERCHARGER PULLEY ISOLATOR

[75] Inventors: Rodney C. Glover, Bloomfield Hills; Kevin M. McGovern, Canton Township; Steven W. Woodard, White Lake, all of Mich.

[73] Assignee: Eaton Corporation, Cleveland, Ohio

[21] Appl. No.: 08/774,698

[22] Filed: Dec. 26, 1996

[51] Int. Cl.[6] .................................................. F02B 33/38
[52] U.S. Cl. ............................... 123/559.1; 418/206.1; 464/57; 464/73; 464/92
[58] Field of Search ................. 123/559.1; 418/206.1; 464/57, 59, 84, 92, 73

[56] References Cited

U.S. PATENT DOCUMENTS

| | | | |
|---|---|---|---|
| 2,093,955 | 9/1937 | Clark | 123/559.1 |
| 2,480,818 | 8/1949 | Whitfield. | |
| 2,521,117 | 9/1950 | Du Bois et al.. | |
| 2,654,530 | 10/1953 | Oldberg. | |
| 2,963,006 | 12/1960 | Karde | 123/559.1 |
| 3,727,431 | 4/1973 | Yokel. | |
| 4,226,095 | 10/1980 | Loken | 464/57 |
| 4,594,992 | 6/1986 | Nakamura et al.. | |
| 4,782,936 | 11/1988 | Bopp. | |
| 4,924,839 | 5/1990 | Mueller et al.. | |
| 5,405,296 | 4/1995 | Cerny et al.. | |

FOREIGN PATENT DOCUMENTS

| | | | |
|---|---|---|---|
| 139354 | 11/1934 | Austria | 123/559.1 |
| 864045 | 1/1941 | France | 123/559.1 |
| 696729 | 9/1953 | United Kingdom | 123/559.1 |

*Primary Examiner*—Michael Koczo
*Attorney, Agent, or Firm*—L. J. Kasper

[57] ABSTRACT

A rotary blower (26) including a pair of shafts (70,56) on which are mounted a pair of rotors (28,29), input to the first shaft (70) being by way of an input pulley (76;108;201). The first shaft (70) has a forward terminal portion (72) extending forwardly of a first timing gear (60) to a location disposed within the input pulley. A torsion damping means is associated with the input pulley (76;108;201) and includes a resilient means (94;124;213) which resists relative rotation between the input pulley and the terminal portion (72) of the first shaft. The torsion damper also includes means (88,90, 92;118,122;207,211) for limiting the relative rotation of the input pulley and the first shaft. The disclosed arrangement provides a more compact, less expensive input portion of the blower which eliminates the need for the conventional "third shaft" and its associated bearings.

10 Claims, 6 Drawing Sheets

SUPERCHARGER PULLEY ISOLATOR

BACKGROUND OF THE DISCLOSURE

The present invention relates to a rotary blower, such as a supercharger, and a torsion damping or isolating mechanism therefor. More specifically, the invention relates to a combination pulley and isolator for reducing audible noise of timing gears in a backflow-type supercharger driven by an internal combustion engine.

Rotary blowers of the backflow-type, particularly Roots-type blowers, have been characterized by noisy operation. The noise generated by Roots-type blowers may be classified as either: (a) solid borne noise caused by clashing of components subjected to fluctuating loads; or (b) fluid borne noise caused by fluid flow characteristics, such as rapid changes in fluid velocity, the "fluid", in the case of a supercharger, comprising air. The present invention is concerned with the former, i.e., solid borne noise, and more specifically, noise caused by timing gear rattle.

The timing gears of Roots-type blowers may produce an objectionable gear rattle when the meshed teeth of the gears are substantially unloaded. Such unloaded conditions occur during non-supercharging, low engine speed modes of operation. The gear rattle may be mitigated by a torsion damping mechanism having a low torque transmitting capacity, low rate spring, as well as forward and reverse stops, the forward stop being operative in case of an abrupt increase in engine speed, or in the input drive torque, and the reverse stop being operative in case of an abrupt change in input speed, such as in the case of engine shut down. Such a torsion damping mechanism is illustrated and described in U.S. Pat. No. 4,944,278, assigned to the assignee of the present invention and incorporated herein by reference.

Although the prior art torsion damping mechanism has been generally satisfactory in operation, it has added substantially to the cost of the blower. For example, its location immediately forward of the timing gear means that, in addition to the two rotor shafts, there must also be a third shaft, transmitting input torque from the supercharger pulley to the input of the torsion damping mechanism. The third shaft requires a bearing, disposed toward each end of the third shaft, the third shaft and the bearings thus adding to the overall axial length, complexity, and cost of the input portion of the blower.

BRIEF SUMMARY OF THE INVENTION

Accordingly, it is an object of the present invention to provide an improved rotary blower, and torsion damping (or isolator) mechanism therefor, which overcomes the above-described disadvantages of the prior art, and more specifically, eliminates the need for a third shaft and its associated bearings.

It is a more specific object of the present invention to provide a rotary blower of the backflow-type, and a torsion damping mechanism therefor, which can substantially reduce the overall axial length, complexity, and cost of the blower, while still providing satisfactory damping function.

The above and other objects of the invention are accomplished by the provision of a rotary blower of the backflow-type including a housing, and first and second rotors rotatably disposed in the housing and having meshed lobes for transporting air from an inlet port to an outlet port. First and second shafts are rotatably supported by the housing and have the first and second rotors, respectively, fixed for rotation therewith. First and second meshed timing gears are

2 fixed for rotation with the first and second shafts, respectively, for preventing contact of the meshed lobes. An input pulley is adapted to be rotatably driven about an axis defined approximately by the first shaft, and in one direction, at speeds proportional to the speed of a periodic combustion torque transmitting engine selectably controllable between a relatively low speed and a relatively high speed. A torsion damping means is operably associated with the input pulley and the first timing gear.

The improved rotary blower is characterized by the first shaft including a forward portion extending forwardly of the first timing gear and axially to a location disposed generally within the input pulley. A bearing means is disposed radially between the forward portion of the first shaft and the input pulley. The torsion damping means comprises resilient means operable to resist relative rotation between the input pulley, and the forward portion of the first shaft. The torsion damping means further comprises means for limiting the relative rotation of the input pulley and the first shaft.

DESCRIPTION OF THE PREFERRED EMBODIMENTS

Figure 1:
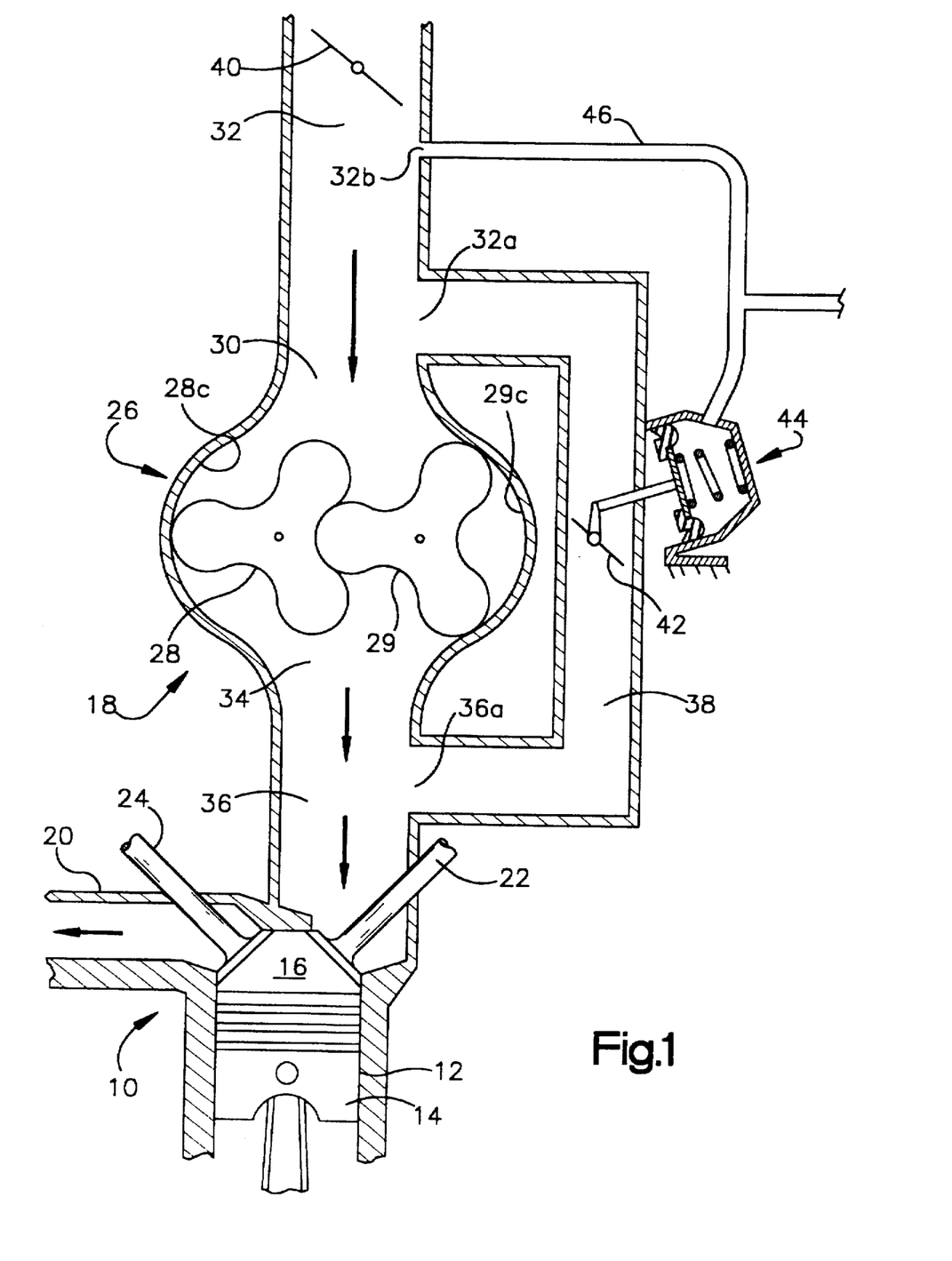
FIG. 1 schematically illustrates an intake manifold assembly having a backflow-type blower or supercharger therein, of the type which may utilize the present invention.

Referring now to the drawings, which are not intended to limit the invention, FIG. 1 is a schematic illustration of an intake manifold assembly, including a Roots blower supercharger and bypass valve arrangement in accordance with the "PRIOR ART". An engine, generally designated 10, includes a plurality of cylinders 12, and a reciprocating piston 14 disposed within each cylinder, thereby defining an expandable combustion chamber 16. The engine includes intake and exhaust manifold assemblies 18 and 20 for directing combustion air to and from, respectively, the combustion chamber 16, by way of intake and exhaust valves 22 and 24, respectively.

The intake manifold assembly 18 includes a positive displacement rotary blower 26 of the backflow or Roots type, as is illustrated and described in U.S. Pat. No. 5,078,583, assigned to the assignee of the present invention and incorporated herein by reference. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively (see FIG. 2). The rotors may be driven mechanically by engine crankshaft torque transmitted thereto in a known manner, such as by means of a drive belt (not illustrated herein). The mechanical drive rotates the blower rotors at a fixed ratio, relative to crankshaft speed, such that the blower displacement is greater than the engine displacement, thereby boosting or supercharging the air flowing to the combustion chambers 16.

The supercharger or blower 26 includes an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at 38. If the engine 10 is of the Otto cycle type, a throttle valve 40 preferably controls air or air-fuel mixture flowing into the intake duct 32 from a source, such as ambient or atmospheric air, in a well known manner. Alternatively, the throttle valve 40 may be disposed downstream of the supercharger 26.

Disposed within the bypass passage 38 is a bypass valve 42 which is moved between an open position and a closed position by means of an actuator assembly, generally designated 44. The actuator assembly 44 is responsive to fluid pressure in the inlet duct 32 by means of a vacuum line 46. Therefore, the actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of suitable linkage.

Figure 2:
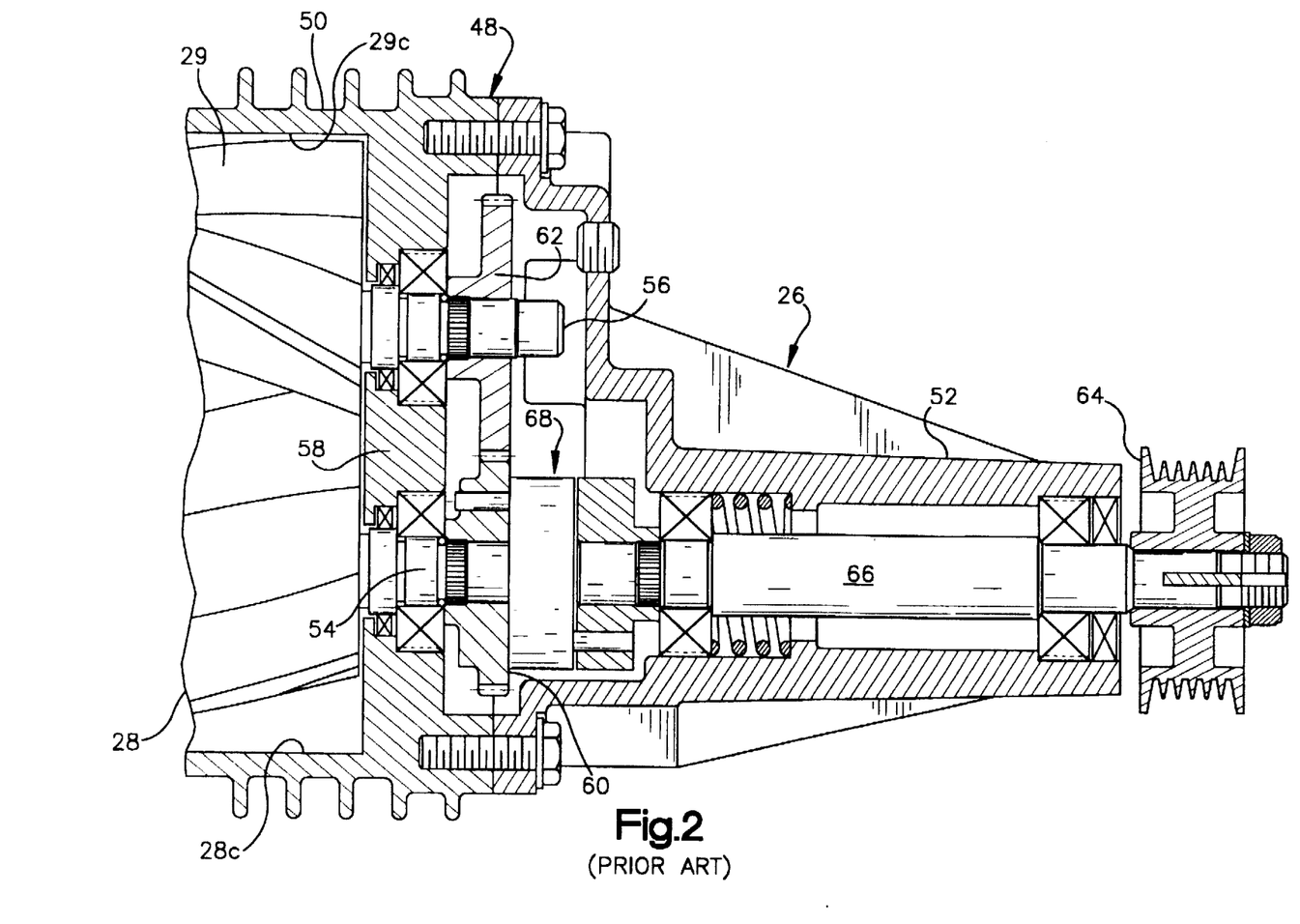
FIG. 2 is a partial, axial section of a "PRIOR ART" supercharger and torsion damping mechanism.

Referring now primarily to FIG. 2, there is shown a forward portion of the blower 26, as made in accordance with the "PRIOR ART". The portion shown includes a housing assembly 48, comprising a main housing 50, and an input housing 52. Disposed within the main housing 50 are the rotors 28 and 29, which are fixed to rotor shafts 54 and 56, respectively. The main housing 50 includes a forward wall portion 58, and the forward ends of the rotor shafts 54 and 56 extend through the forward wall portion 58, as may be seen in FIG. 2. Mounted on the forward ends of the rotor shafts 54 and 56 are meshed timing gears 60 and 62, respectively. As is well known to those skilled in the art, the timing gears 60 and 62 are press-fit onto the rotor shafts 54 and 56, and are operative to prevent contact of the lobes of the rotors 28 and 29.

Disposed adjacent the forward end of the input housing 52 is an input pulley 64, secured to an input shaft 66 by any suitable means, well known in the art. The input shaft 66 (referred to in the BACKGROUND OF THE DISCLOSURE as the "third shaft") extends axially through the input housing 52, and terminates adjacent the forward end of the rotor shaft 54, and is substantially coaxial therewith.

The "PRIOR ART" device shown in FIG. 2 includes a torsion damping mechanism, generally designated 68, which is typically made in accordance with the teachings of U.S. Pat. No. 4,924,839, assigned to the assignee of the present invention and incorporated herein by reference. Thus, in the "PRIOR ART" supercharger, the inclusion of the torsion damping mechanism 68 necessitates the additional input shaft 66, as well as its associated bearings, thus ensuring the overall length and complexity of the input housing 52 and the blower 26 as shown in FIG. 2.

Figure 3:
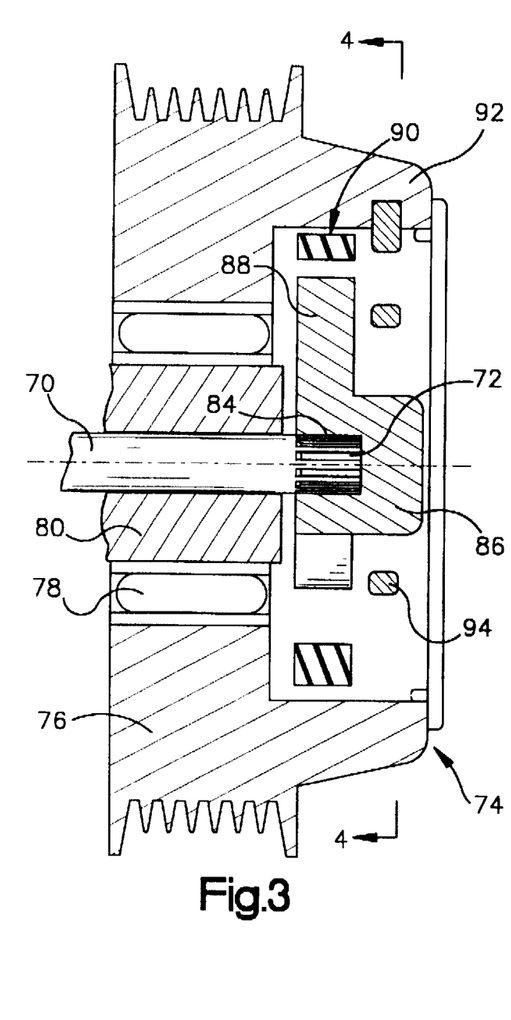
FIG. 3 is an axial cross-section, similar to FIG. 2, illustrating one form of the pulley and torsion damping mechanism of the present invention.
Figure 3A:
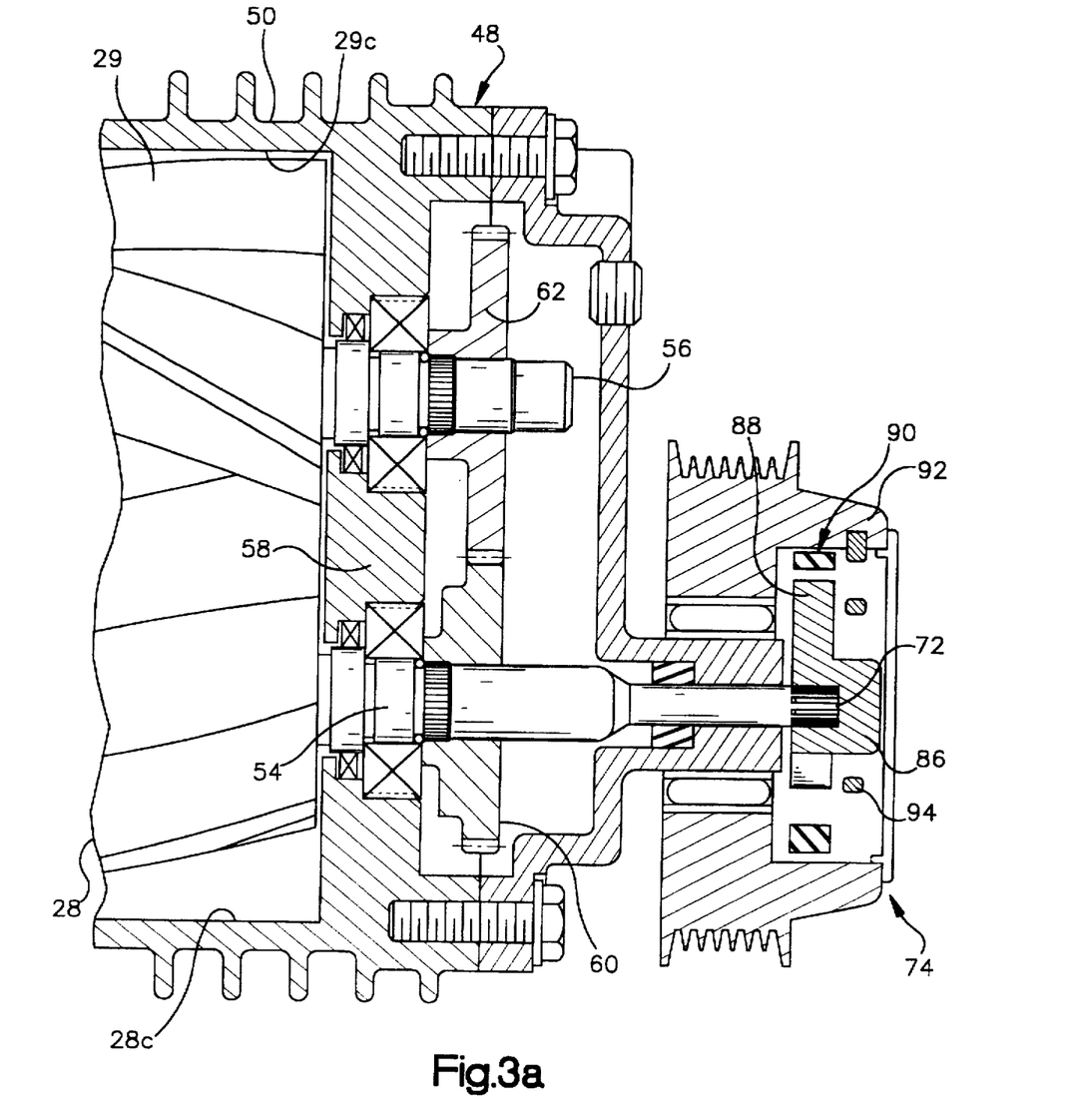
FIG. 3a is a fragmentary, axial cross-section of the pulley and torsion damping mechanism of FIG. 3 in combination with a supercharger.
Figure 4:
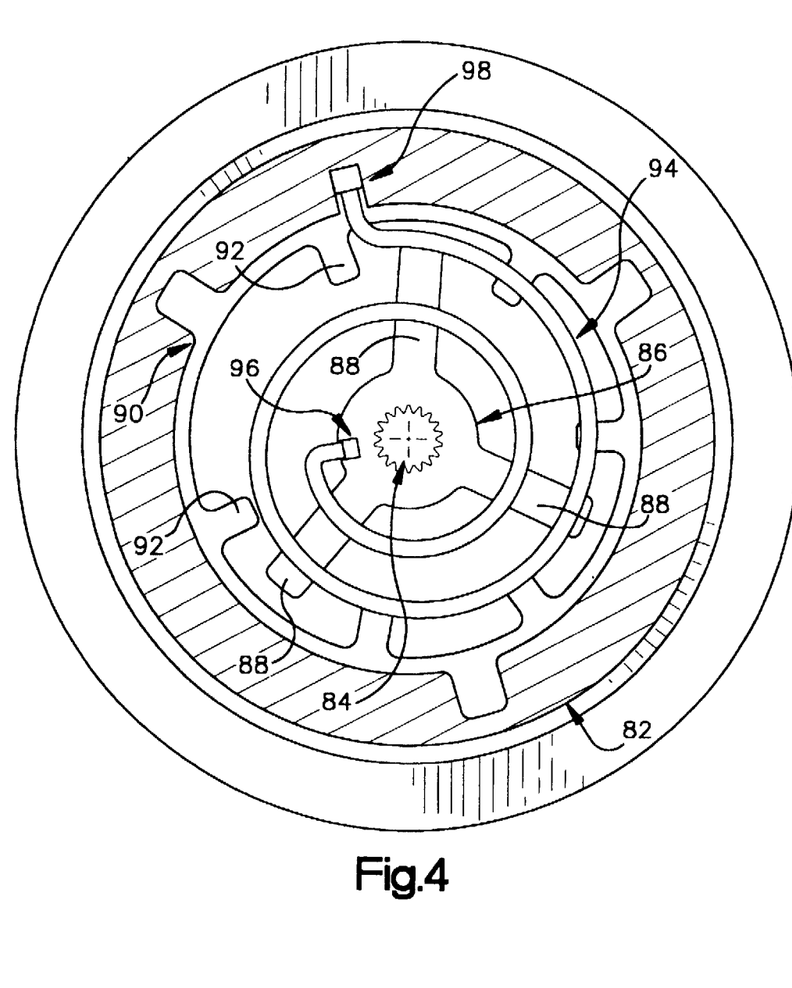
FIG. 4 is a transverse cross-section, taken on line 4—4 of FIG. 3, and on the same scale.

Referring now primarily to FIGS. 3, 3a, and 4, the improved supercharger input portion and torsion damping mechanism of the present invention will now be described. In accordance with one important aspect of the present invention, the rotor shaft 54 is replaced by a rotor shaft 70 which extends further forwardly than the shaft 54 in the "PRIOR ART" device of FIG. 2. Mounted on the rotor shaft 70 (but not specifically shown herein) would be the meshed timing gear 60, in accordance with the previous description. The rotor shaft 70 includes a forward terminal portion 72 which extends forwardly into an input pulley assembly, generally designated 74.

The input pulley assembly 74 includes a pulley member 76 which is mounted, by means of a set of bearings 78 for rotation relative to an input housing 80, which is shown only fragmentarily in FIG. 3, and replaces the input housing 52 of FIG. 2. The pulley member 76 includes an axially extending annular portion 82, within which is disposed the torsion damping mechanism of the present invention.

The forward terminal portion 72 of the rotor shaft 70 has attached thereto, such as by means of a serration 84, a hub member 86, although other attaching means could be used, such as a taper fit. The hub member 86 includes, by way of example only, three radially extending support members 88, each of which extends most of the radial distance out toward the annular portion 82 of the pulley member 76.

Disposed within the annular portion 82 is a bumper insert 90, including a plurality of radially inwardly extending bumpers 92. Preferably, with the mechanism in the neutral position shown in FIG. 3, there will be a pair of the bumpers 92 disposed on circumferentially opposite sides of each of the support members 88, and equally spaced therefrom. The function of the bumpers 92 will be described subsequently. Disposed forwardly of the support members 88 is a spiral spring member 94 having an inner end 96 fixed to the hub member 86, and an outer end 98, fixed to the annular portion 82. Preferably, the spiral spring 94 is configured, as shown in FIG. 4, such that "wind up" occurs under normal operating conditions, in which the pulley member 76 rotates in the clockwise direction, thus driving the rotor shaft 70, and the timing gear 60 and rotor 28, in the clockwise direction.

Whenever there is a relatively low torque input to the pulley 76, the torque is transmitted entirely through the spiral spring 94, from the annular portion 82 of the pulley 76 to the hub member 86, and therefore, to the rotor shaft 70. If there is an abrupt increase in engine speed and/or torque, there will be a rotational displacement of the pulley 76, relative to the hub member 86, in the forward (clockwise) direction. Every other one of the bumpers 92 will resiliently engage the adjacent support member 88, and thereafter, torque will be transmitted from the pulley 76 through the bumpers 92 to the support members 88, then to the hub member 86. The engagement of the bumpers 92 and support members 88 is described as "resilient" because, preferably, both the bumper insert 90 and the hub member 86 comprise an elastomeric material, one example of which would be the material sold under the trade name and trademark "Hytril" by DuPont.

In the case of engine shutoff, the momentum of the blower 26 will cause the rotor shaft 70 to continue to rotate in the same direction, as will the hub member 86 and support members 88, thus resulting in resilient engagement of each of the support members 88 with the bumper 92 which is immediately adjacent in the clockwise direction. It is believed to be within the ability of those skilled in the art to select the spring 94 to achieve the appropriate torque transmission, on the one hand, but with sufficient torsion damping, on the other hand. Typically, the embodiment shown in FIGS. 3 and 4, utilizing a spring, would be employed on relatively larger superchargers, whereas the embodiments to be described subsequently would be used on relatively smaller ones.

Figure 5:
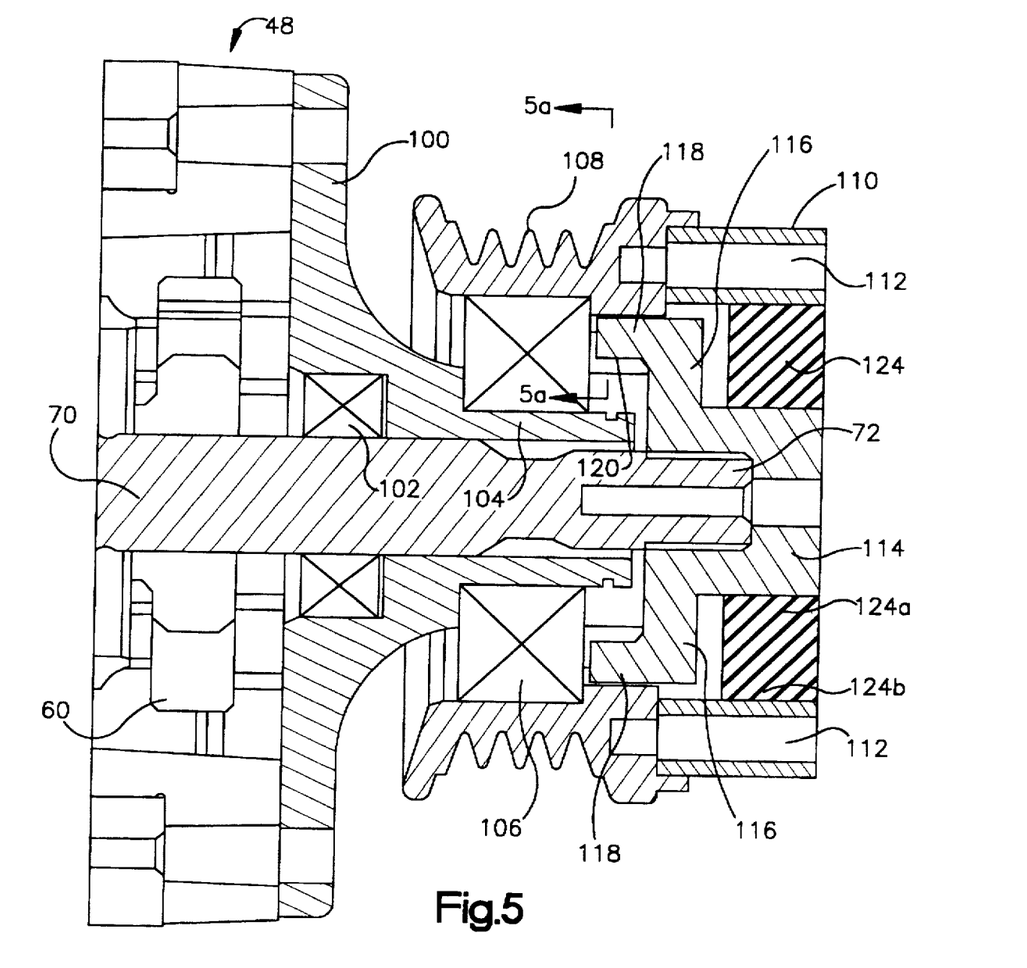
FIG. 5 is an axial cross-section, similar to FIG. 3, illustrating an alternative embodiment of the present invention.
Figure 5A:
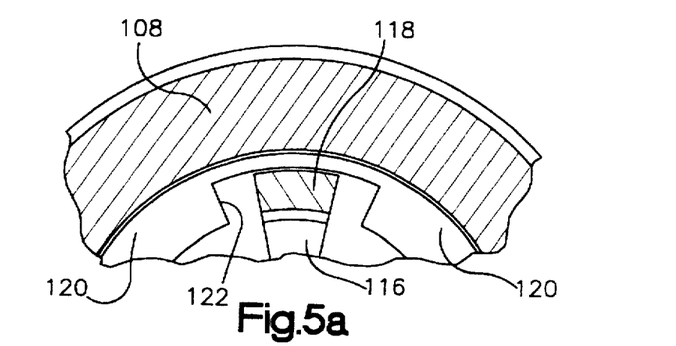
FIG. 5a is a transverse cross-section, taken on line 5a—5a of FIG. 5, and on approximately the same scale as FIG. 5.

Referring now primarily to FIGS. 5 and 5a, an alternative embodiment of the invention will be described. One purpose of FIG. 5 is to illustrate the way in which the present invention can result in a much more compact (axially shorter) arrangement. In the embodiment of FIG. 5, the housing assembly 48 includes an input housing 100 within which is disposed a bearing set 102. The rotary shaft 70, upon which the timing gear 60 is disposed, is rotatably supported within the bearing set 102, with the only other bearing set needed to support the rotor shaft 70 being the one disposed at the rearward end of the supercharger. Thus, rather than having two shafts requiring four bearing sets as in the FIG. 2 "PRIOR ART", with the present invention it is possible to have only a single rotary shaft 70 requiring only two bearing sets.

The input housing 100 includes a forward, reduced diameter portion 104, about which is disposed a bearing set 106. Rotatably supported by the bearing set 106, relative to the input housing 100 is a pulley member 108, such that, conceptually, the bearing set 106 is disposed radially between the shaft 70 and the pulley member 108.

Disposed forwardly of the pulley member 108 is an annular member 110 which defines several axial bores 112, by means of which the annular member 110 may be bolted to the pulley member 108, the bolts not being shown herein for ease of illustration. In splined engagement with a forward terminal portion 72 of the rotary shaft 70 is a hub member 114. The hub member 114 preferably includes a pair of diametrically opposed, radially extending arms 116, each of which terminates, at its radially outward end, in a generally arcuate stop portion 118. As may best be seen in FIG. 5a, the pulley member 108 includes a radially inwardly extending flange 120, which defines a pair of diametrically opposed arcuate recesses 122 (shown only in FIG. 5a). Each arcuate stop portion 118 is received within the respective arcuate recess 122, and when the device is "at rest", the stop portion 118 is preferably centered within the recess 122, as shown in FIG. 5a.

Disposed radially between the annular member 110 and the hub member 114 is an annular torsion damping member 124 which preferably comprises an elastomeric material, selected to provide the desired torsion damping characteristics for the particular supercharger/engine combination. In the embodiment of FIG. 5, the torsion damping member 124 comprises a solid annulus of material, although it will be apparent to those skilled in the art that the "spring rate" of the damping member 124 may be reduced, as is appropriate, by the inclusion within the member 124 of a plurality of openings or "voids" of various sizes and shapes. In either event, it is preferred in the FIG. 5 embodiment that the damping member 124 have its radially inner portion 124a bonded, by means of an appropriate adhesive, to the adjacent surfaces of the hub member 114, and similarly, have its radially outer portion 124b bonded to the adjacent surface of the annular member 110. It is believed to be within the ability of those skilled in the art to select an appropriate adhesive, or other bonding means, in view of the torque being transmitted through the member 124.

In operation, the torsion damping member 124 functions in generally the same manner as the spring 94 in the embodiment of FIGS. 3 and 4. In response to relatively low torque inputs to the pulley 108, in the clockwise direction (as viewed from the fight in FIG. 5), the damping member 124 is compressed by the movement of the annular member 110, in the clockwise direction, relative to the hub member 114. The compressed damping member 124 thus transmits a relatively light torque to the hub member 114 and rotor shaft 70. In the event of a sudden increase in engine speed and/or torque, the annular member 110 is rotationally displaced even further in the clockwise direction, relative to the hub member 114, such that each of the stop portions 118 moves to the clockwise end of its respective recess 122, engaging the end surface thereof.

In the case of engine shut-off, the rotor shaft 70 and hub member 114 will continue to rotate in the clockwise direction, thus compressing the damping member 124, but now in the opposite sense, this compression of the member 124 continuing until each of the stop portions 118 engages a surface of its respective recess 122 at the counterclockwise end thereof (i.e., the right end in FIG. 5a).

Figure 6:
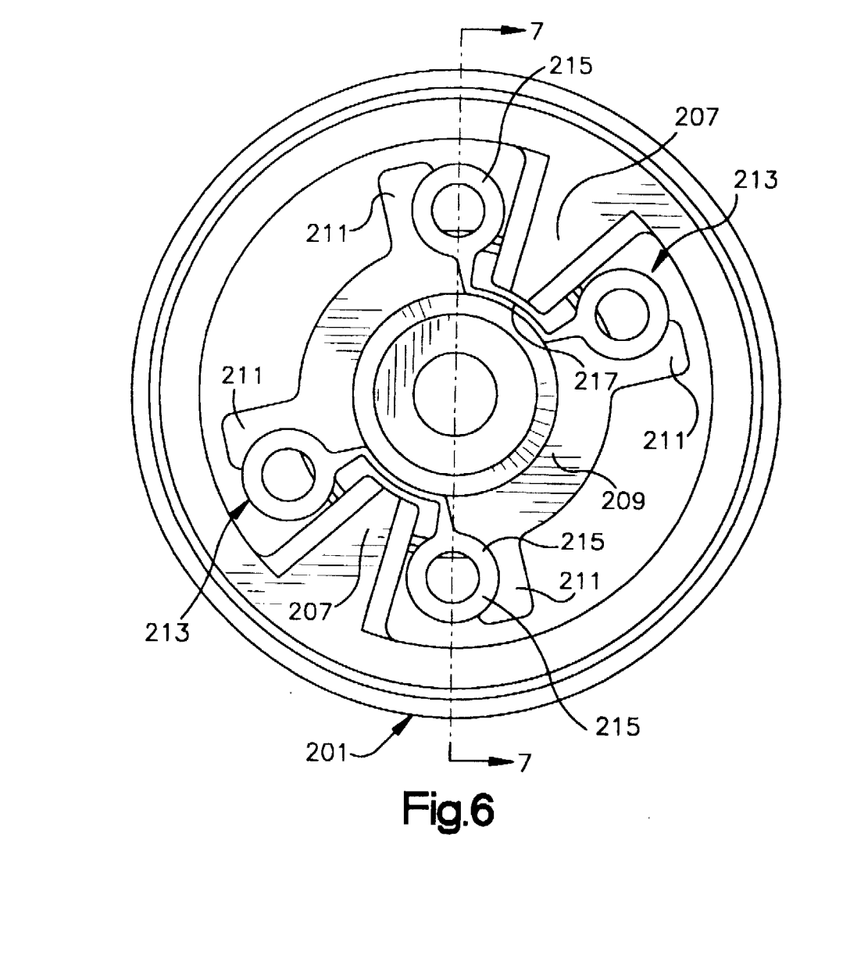
FIG. 6 is a transverse cross-section of another alternative embodiment of the present invention.
Figure 7:
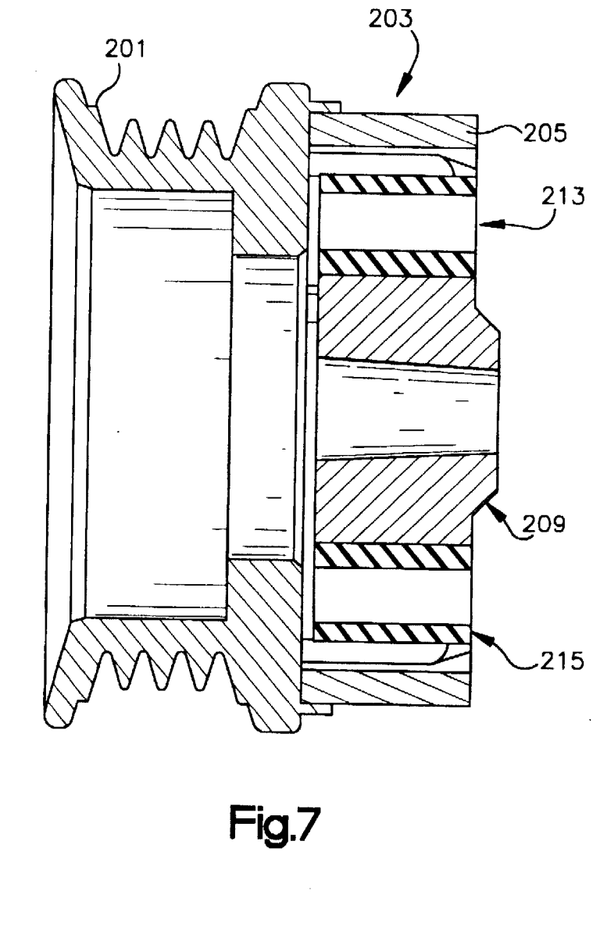
FIG. 7 is an axial cross-section, taken on line 7—7 of FIG. 6.

In the embodiment of FIGS. 3 and 4, as well as in the embodiment of FIG. 5, the torsion damper mechanism was illustrated as being disposed "forwardly" of the pulley. An alternative embodiment is illustrated in FIGS. 6 and 7, in which each element bears a reference numeral in excess of "200", but wherein the damper or isolator is still disposed forwardly of the pulley. In FIGS. 6 and 7, for ease of illustration, the rotor shaft, the input housing, the bearings, etc., are all omitted. In the embodiment of FIGS. 6 and 7, there is a pulley member 201, and disposed forwardly thereof is a torsion damping mechanism, generally designated 203. It should be understood by those skilled in the art that whether the torsion damper 203 is forward or rearward of the pulley 201 is not an essential feature of this embodiment, nor of the previous embodiments.

The torsion damper mechanism 203 comprises a generally annular member 205, which is fixed to rotate with the pulley member 201. The annular member 205 includes, preferably formed integrally therewith, a pair of radially inwardly extending bumpers 207, which preferably are diametrically opposite each other. In engagement with the forward terminal portion of the rotor shaft is a hub member 209, which includes a plurality of radially extending support members 211. In the subject embodiment, there are four of the support members 211, such that in the neutral position of the damper mechanism, there are two of the members 211 equally and oppositely disposed about each of the bumpers 207.

Disposed between the hub member 209 and each of the bumpers 207 is an isolator member, generally designated 213. Each of the isolator members 213 comprises a suitable elastomeric material, and includes a pair of generally cylindrical isolators 215, which are interconnected by a web portion 217, to help maintain the entire isolator member 213 in the position shown in FIG. 6 when the torsion damping mechanism 203 is in the neutral position shown therein. In operation, each of the members 215 functions in somewhat the same manner as the isolator member 124 in the embodiment of FIG. 5. As the pulley member 201 is driven to rotate in the clockwise direction as viewed in FIG. 6, the annular member 205 rotates clockwise, relative to the hub member 209, and each of the bumpers 207 begins to compress the member 215 disposed clockwise from the bumper 207, thus transmitting a relatively light torque to the adjacent support member 211, and to the hub member 209, in generally the manner described previously. In the event of a sudden increase in engine speed and/or torque, the annular member 205 is displaced even further, relative to the hub member 209, such that each of the members 215 which is being compressed at that time becomes nearly fully compressed, almost to the point of being "solid", thus limiting the relative rotational displacement of the annular member 205 and the hub member 209.

In the case of engine shutoff, the hub portion 209 will then rotate clockwise, relative to the annular member 205, compressing each of the members 215 which is disposed counterclockwise from one of the bumpers 207. Thus, it may be seen that the embodiment of FIGS. 6 and 7 differs somewhat from those of FIGS. 3 and 4, and FIG. 5. In the first two embodiments, there is a resilient member (the spring 94 or the damping member 124) having its outer portion fixed relative to the pulley, and its inner portion fixed relative to the rotor shaft, such that relative rotation therebetween twists, or compresses the resilient member. In the embodiment of FIGS. 6 and 7, the isolator members 213 are not fixed relative to the pulley or the rotor shaft, but instead are compressed in the circumferential direction as a result of relative rotation between the pulley and the rotor shaft.

It is believed to be within the ability of those skilled in the art to configure the elastomeric member 213 and the individual members 215 to provide the appropriate spring rate, etc., to achieve the desired amount of damping, for a particular supercharger torque requirement, and for a particular engine application. As was noted in connection with FIG. 5, the member 124 may include voids to reduce the spring rate, and such is effectively illustrated in the embodiment of FIGS. 6 and 7, in which each of the members 215 is not solid, but cylindrical, and defines a cylindrical opening or void.

It should be noted that one benefit of the various arrangements which comprise the present invention is the ability of the pulley and torsion damping mechanism to accommodate any misalignment between the pulley and the rotor shaft.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A rotary blower of the backflow type including a housing; first and second rotors rotatably disposed in said housing and having meshed lobes for transporting air from an inlet port to an outlet port; first and second shafts rotatably supported by said housing and having said first and second rotors, respectively, fixed for rotation therewith; first and second meshed timing gears fixed for rotation with said first and second shafts, respectively, for preventing contact of said meshed lobes; an input pulley adapted to be rotatably driven about an axis defined approximately by said first shaft, and in one direction, at speeds proportional to the speed of a periodic combustion torque transmitting engine selectively controllable between a relatively low speed and a relatively high speed; torsion damping means operably associated with said input pulley and said first timing gear; characterized by:

(a) said first shaft including a forward portion extending forwardly of said first timing gear and axially to a location disposed generally within said input pulley;

(b) bearing means disposed radially between said forward portion of said first shaft and said input pulley;

(c) said torsion damping means comprising resilient means operable to resist relative rotation between said input pulley, and said forward portion of said first shaft; and (d) said torsion damping means further comprising means for limiting the relative rotation of said input pulley and said first shaft.

2. A rotary blower as claimed in claim 1 characterized by said forward portion of said first shaft including a terminal portion extending forwardly of said bearing means, said torsion damping means being operably associated with said terminal portion of said first shaft.

3. A rotary blower as claimed in claim 2 characterized by said torsion damping means including a hub member fixed to rotate with said terminal portion of said first shaft, said resilient means including a radially inner portion attached to said hub member.

4. A rotary blower as claimed in claim 2 characterized by said input pulley including a generally annular portion extending forwardly of said input pulley, said resilient means including a radially outer portion attached to said annular portion.

5. A rotary blower as claimed in claim 2 characterized by said means for resiliently limiting the relative rotation of said input pulley and said first shaft comprises a hub member fixed to rotate with said terminal portion of said first shaft, said hub member including radially extending support members, and said input pulley including stop members extending radially inward for engagement with said support members, when said input pulley reaches a maximum rotational displacement reactive to said first shaft in said one direction.

6. A rotary blower as claimed in claim 1 characterized by said torsion damping means comprising resilient means disposed to be circumferentially compressed in response to relative rotational movement of said input pulley and said first shaft.

7. A rotary blower as claimed in claim 6 characterized by said resilient means comprising a plurality of isolator members, said input pulley including an annular portion having a radially inwardly extending stop portions adapted to engage each of said isolator members, in response to relative rotational movement of said input pulley and said first shaft.

8. A rotary blower as claimed in claim 7 characterized by said torsion damping means including a hub member fixed to rotate with said first shaft, said hub member including a radially outwardly extending support portion adapted to engage each of said isolator members, in response to relative rotational movement of said input pulley and said first shaft.

9. A rotary blower as claimed in claim 6 characterized by said resilient means comprising a plurality of isolator members, each of said isolator members comprising a member defining a void, thereby reducing the spring rate of said isolator member.

10. A rotary blower as claimed in claim 9 characterized by each of said isolator members comprising a generally cylindrical member defining a generally cylindrical void.

* * * * *